April 26, 1932.   J. R. HUGHES   1,855,761
FENDER
Filed Oct. 29, 1930    2 Sheets-Sheet 2

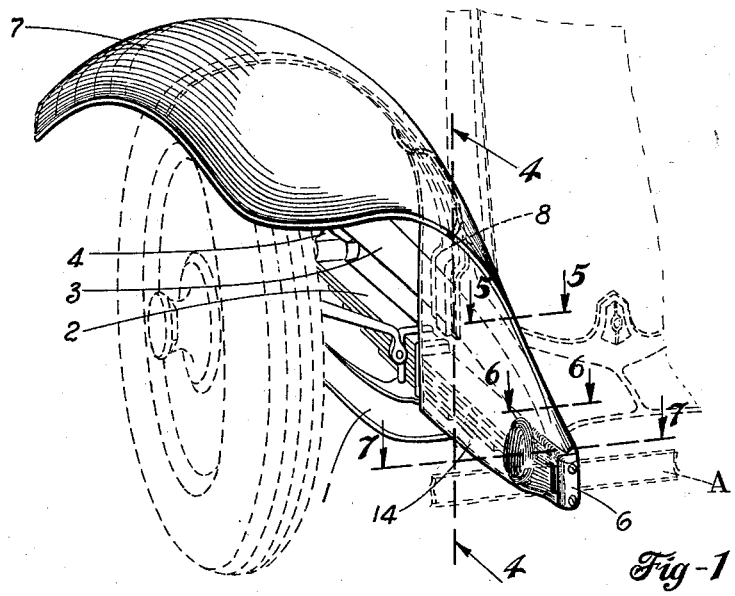
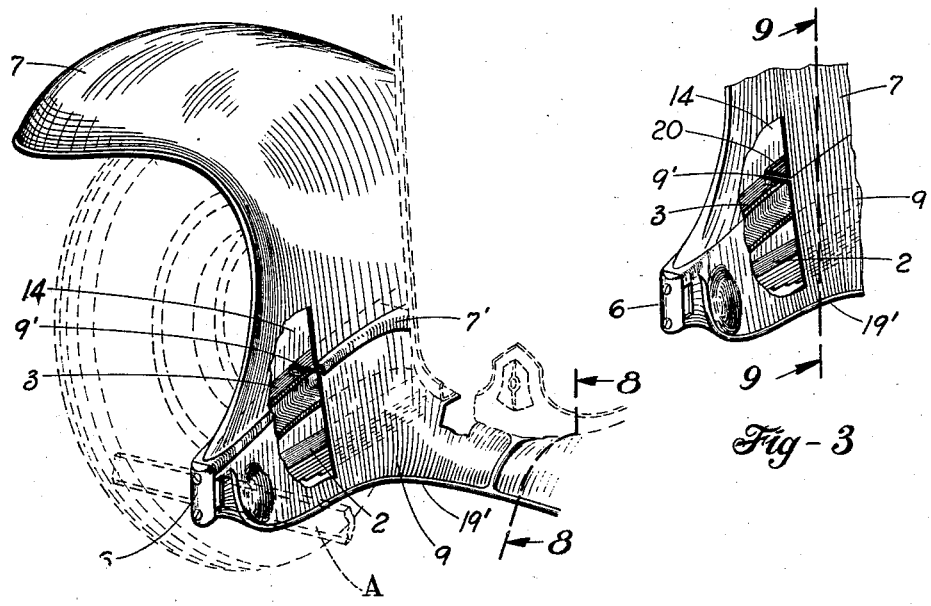

INVENTOR.
BY James R. Hughes
ATTORNEY.

Patented Apr. 26, 1932

1,855,761

UNITED STATES PATENT OFFICE

JAMES R. HUGHES, OF SOUTH BEND, INDIANA, ASSIGNOR TO THE STUDEBAKER CORPORATION, OF SOUTH BEND, INDIANA, A CORPORATION OF NEW JERSEY

FENDER

Application filed October 29, 1930. Serial No. 491,928.

This invention relates to a novel fender construction for use in automobiles.

An object of the invention relates to a novel protective device for use in automobiles.

Another object consists in the provision of a shield for motor vehicle spring suspension assemblies.

A further object relates to a removable protective shield for the under surfaces of automobile fenders.

A more specific object of the invention comprises a device associated with fenders and adapted to serve as a shield for vehicle spring assemblies and for the under surface of the fenders.

A further object pertains to the ornamentation of automobile fenders.

Further objects will become evident from the following detailed description of the invention.

Referring to the drawings which show suitable embodiments of the present invention;

Figure 1 is a perspective view showing the fender embodying the features of the invention, assembled on an automobile, the view being taken from the left hand side of the automobile.

Figure 2 is a perspective view, partially in section, of the assembly shown in Figure 1, taken from the right hand side of the automobile.

Figure 3 is a fragmentary perspective view partially in section, of a modification.

Figure 4:
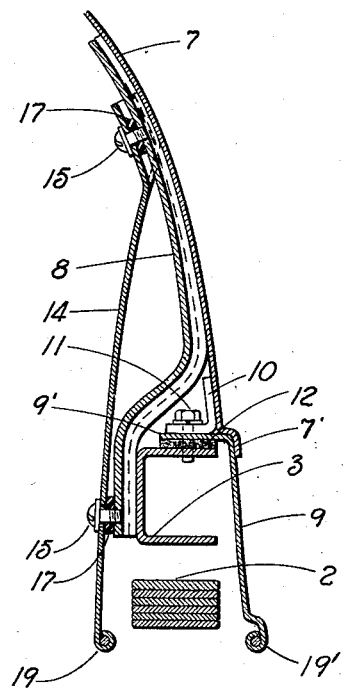
Figure 4 represents a section taken substantially along section line 4—4 of Figure 1.

According to conventional automobile design, the body frame is supported upon multiple leaf springs by means of shackles which pivotally connect the frame to its resilient supports. Fenders, provided adjacent to the wheels of the vehicle, are fastened above the springs and extend outwardly over the wheels. This construction exposes the springs, shackles, and under surface of the fenders to flying stones, mud, dirt, water and the like which present ever-present damaging influences to the car. The shackles and springs require careful lubrication to prevent wearing away of sliding surfaces and to eliminate a fertile cause of squeaks and rattles. However, in the usual form of construction the oiled and greased surfaces of the springs and shackles are ready accessible to flying débris which diminishes the efficiency of the lubricant and introduces a positive cause of abrasion. Under conventional forms of construction, the under surface as well as the springs and shackles quickly become covered with mud, asphalt and other forms of dirt which may be removed only with great difficulty, and they are furthermore liable to damage from flying stones and other destructive bodies.

In the practice of my invention, I substantially eliminate these disadvantages by providing the fenders with shields which are adapted also to enclose the springs and shackles. These shields serve to protect the enclosed elements, and they may be made removable for the purpose of cleaning, repairing or replacing the same. I have illustrated the invention as used in connection with the front fenders only, but it will be understood that by virtue of a slight change of construction, shields may likewise be disposed on the rear fenders without departing from the scope of the invention described and then claimed.

The shields may if desired be lacquered on their outer sides to blend with the lacquered fender surfaces, thus eliminating the usual unsightly effect of mud-caked fender under surfaces.

The invention will be better understood from a description of the drawings in which 1 is a front wheel axle to which is fixed in the usual fashion a longitudinal multiple leaf spring 2, supporting a frame 3 by means of shackles 4 and shackle bolts 5. A bracket 6 serves to clamp the back bar of a bumper A in place on the vehicle. A fender 7 extends outwardly over the car wheel and is mounted on the frame 3 by means of elongated brackets 8 which extend across the under surface of the fender, and which are fastened to the side of the frame in any approved manner.

In the form of the invention shown in Figures 2 and 4, a dust apron or pan 9 is provided with an inturned flange 9' which serves to fasten it to the frame 3 and with a reinforcing bead 19' at its lower free edge to provide a neat and smooth finish. The lower edge of the fender 7 is shaped as an angle portion 7' which overlaps the flanged side edge of the dust apron 9. Angle brackets 10 fastened to the lower rim of the fender 7 serve to act as further fastening means to clamp the fender to the car frame 3. Bolts 11 extend through holes formed in brackets 10 and the flanged portion 9' of the dust apron 9, fastening them to the frame. A felt or rubber strip 12 may be inserted next to the frame, if desired.

Figure 9:
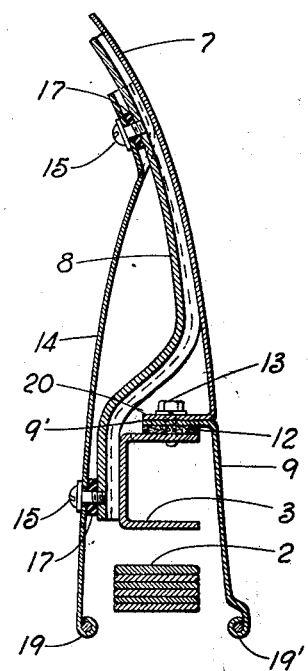
Figure 9 is a section taken along section line 9—9 of Figure 3.

In the modification shown in Figures 3 and 9, the lower edge of the fender 7 may be formed with an inturned flange 20 coinciding with the flange 9' on the dust apron 9, and bolts 13 fasten the dust apron and lower edge of the fender to the frame.

Figure 5:
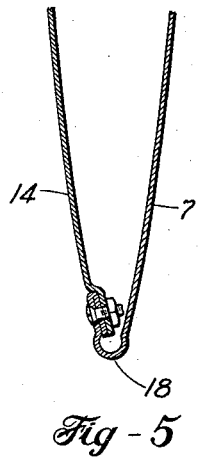
Figure 5 is a section taken substantially along section line 5—5 of Figure 1.
Figure 6:
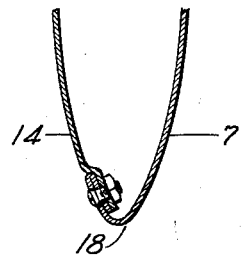
Figure 6 is a section taken substantially along section line 6—6 of Figure 1.

A shield 14 is adapted to be removably associated with the fender 7, and may be fastened at its inner end to the fender 7 by means of bolts 15 which have a threaded connection with holes formed in the elongated brackets 8. Strips 17 of rubber felt or similar material may be used to insure a tight connection. The shield 14 may be securely clamped along its forward edge to the fender 7 by turning the forward upper edge of the fender to form a flange 18, shown in Figures 5 and 6, and bolting the flange 18 to the forward edge of the shield 14.

The upper portion of the shield 14 is shaped to the fender 7, the shield being progressively flared outwardly as shown in Figure 4, and extended downwardly below the lower surface of the leaf spring 2, and extending forwardly beyond the front shackle bolt, to bracket 6. The lower edge of the shield will be preferably in the same horizontal plane as the lower edge of the dust apron 9, and it will be formed with a reinforcing bead 19. The shield 14 may extend rearwardly as far as desired, but in its preferred form the rear edge will be vertically disposed immediately in front of the front axle 1.

Figure 7:
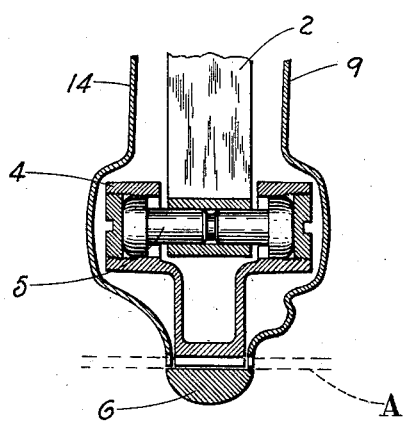
Figure 7 is a section taken substantially along section line 7—7 of Figure 1.
Figure 8:
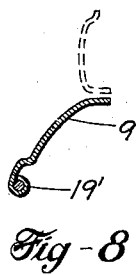
Figure 8 is a section taken along section line 8—8 of Figure 2.

The shield 14 and dust pan 9 will be correspondingly shaped at the forward lower corner to enclose the front shackle as shown in Figure 7. The shield will be preferably of sheet metal and may if desired, have a lacquered outer surface to match the lacquered surface of the fender.

Various modifications in design, size and shape may be made without departing from the spirit of the invention. For example, the shield may be turned in at its lower portion to enclose the bottom of the spring assembly and other means for fastening the shield may be substituted for the means described.

It will be understood from the above description that the shield offers a substantial protection for the inner surface of the fender and for the resilient car supports.

It may cooperate with the dust apron in the manner described to form a complete envelop for the spring. The shield may easily and quickly be removed for the purpose of cleaning or polishing it, for replacement, or for any other reason.

Having thus described my invention, what I claim is:

1. An assembly for use in motor vehicles comprising a vehicle frame, a spring suspension means therefor, a fender positioned above the frame and said means, and a shield secured to the under side of the fender, and overlying the outer side of the front end portion of said spring suspension means.

2. An assembly for use in motor vehicles comprising a vehicle frame, a spring suspension means therefor, a fender positioned above the frame and said means, and a shield removably associated with the under side of the fender, the shield extending downwardly from and outwardly of the fender, and overlying the outer side of the front end portion of said spring suspension.

3. An assembly for use in motor vehicles comprising a vehicle frame, a spring suspension means therefor, a fender positioned above the frame and said means, and a shield removably associated with the under side of said fender, the shield being wholly rearward of the front edge of said fender and extending downwardly from and outwardly of said fender, a sufficient distance to enclose at least a portion of the spring suspension means at one side thereof.

4. An assembly for use in motor vehicles comprising a vehicle frame, a leaf spring disposed longitudinally of the frame and adapted to form a resilient support for the frame, a fender positioned above the frame and spring, and a shield removably associated with the under side of the fender lying wholly rearward of the front edge thereof, and extending outwardly of and downwardly from the fender a sufficient distance to enclose at least a portion of the spring at one side thereof.

5. An assembly for use in motor vehicles comprising a vehicle frame, a leaf spring disposed longitudinally of the frame and resiliently supporting the frame on shackles, a fender positioned above the frame and spring, and a shield removably associated with the under side of the fender lying wholly rearward of the front edge of said fender, and extending outwardly of and downwardly from the fender and formed so as to enclose a shackle and at least a portion of the spring at one side thereof.

6. An assembly for use in motor vehicles comprising a vehicle frame, a leaf spring disposed longitudinally of the frame and resiliently supporting the frame at its forward end, a front fender positioned above the frame and spring, a shield removably associated with the under surface of the fender and coinciding with the forward end of the fender, said shield extending outwardly of and downwardly from the fender, a dust apron positioned at the front of the vehicle frame having a side portion thereof extending below the vehicle frame, the lower edges of the shield and apron being extended downwardly a sufficient distance to enclose a front portion of the spring at opposite sides thereof.

7. An assembly for use in motor vehicles comprising a vehicle frame, a leaf spring disposed longitudinally of the frame and resiliently supporting the frame at its forward end on shackles, a front fender positioned above the frame and spring, a shield removably associated with the under surface of the fender and coinciding with the forward end of the fender, said shield extending outwardly of and downwardly from the fender, a dust apron positioned at the front end of the vehicle frame having a side portion thereof extending below the vehicle frame, the lower edges of the dust apron and of the shield extending downwardly and forwardly a sufficient distance to enclose a shackle and a front portion of the spring from opposite sides thereof.

8. In combination, a vehicle frame member, a fender positioned above the frame member and anchored thereto, a dust apron fastened to said member, at one side thereof, the lower edge of the fender being lapped over a portion of the dust apron, and a shield removably associated with the under side of the fender and lying wholly rearward of the forward edge of the fender.

9. In combination, a vehicle frame member, a fender positioned above the frame member, a dust apron positioned at one side of said member, said fender and dust apron being formed with meeting flanges whereby to fasten them to the frame member, and a shield removably associated with the under side of the fender and lying wholly rearward of the forward edge of the fender.

10. A fender construction for use in motor vehicles, comprising a fender, and a shield removably associated with the under side of the fender substantially the entire area of the shield overlapping the forward portion of the fender.

11. A fender construction for use in motor vehicles, comprising a fender, and a shield removably associated with the under side of the fender, said shield extending outwardly from said fender and having its lower edge disposed downwardly of the lower edge of the fender a sufficient distance to enclose a portion of a vehicle spring when the fender is in assembled position substantially the entire area of said shield being back of the forward edge of the fender.

12. A shield adapted to be used in a fender construction comprising an upper portion adapted to be fastened to the under surface of a fender in overlapping relation thereto, and a lower portion shaped to extend downwardly from and outwardly of the fender when the shield is fastened in position, the lower edge of the shield being spaced from the upper edge a sufficient distance so that said lower edge will be disposed downwardly of the lower edge of the fender.

13. In combination with a vehicle having a frame and a supporting spring, a dust shield mounted on said frame and extending downwardly to conceal the inner side of the front portion of said frame and spring, a fender mounted on said dust shield, and a shield secured to said fender and extending downwardly opposite said dust shield to conceal the outer side of said front portion of said frame and spring.

14. In combination with a vehicle having a front axle, a frame and a supporting spring, a portion of said frame and said spring projecting in front of said axle, a fender mounted upon and extending upwardly from said frame and a shield secured to the underside of said fender and overlapping that portion of the underside of said fender from approximately the vertical plane of the forward edge of said axle to the end of said frame.

Signed by me at South Bend, Indiana, this 27th day of October, 1930.

JAMES R. HUGHES.